Dec. 30, 1958   J. A. BLACK   2,866,405
SILK SCREEN STENCILLING MACHINE
Filed Feb. 24, 1955   7 Sheets-Sheet 1

INVENTOR
James A. Black
BY John S. Braddock
ATTORNEY

Dec. 30, 1958  J. A. BLACK  2,866,405
SILK SCREEN STENCILLING MACHINE
Filed Feb. 24, 1955  7 Sheets-Sheet 3

INVENTOR
James A. Black
BY John S. Braddock
ATTORNEY

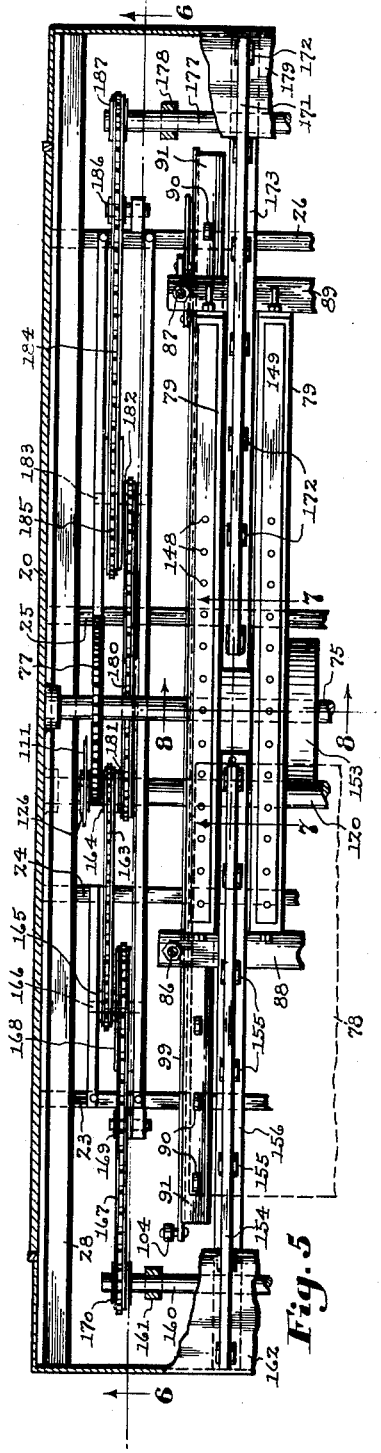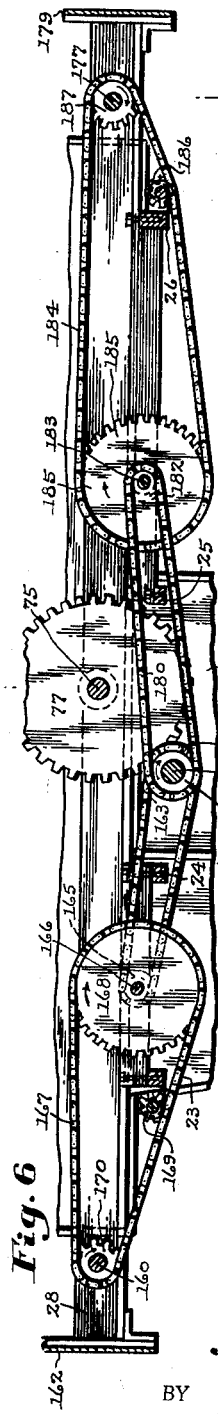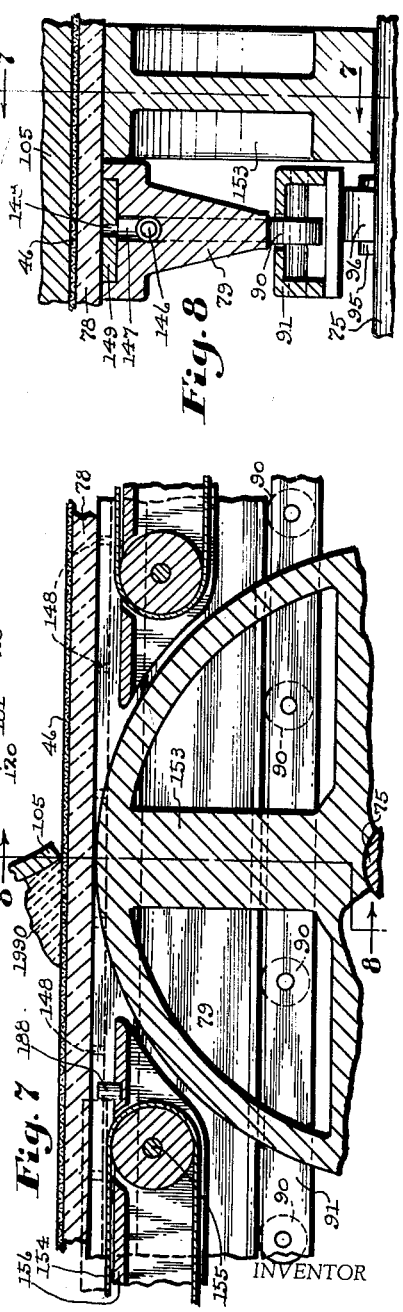

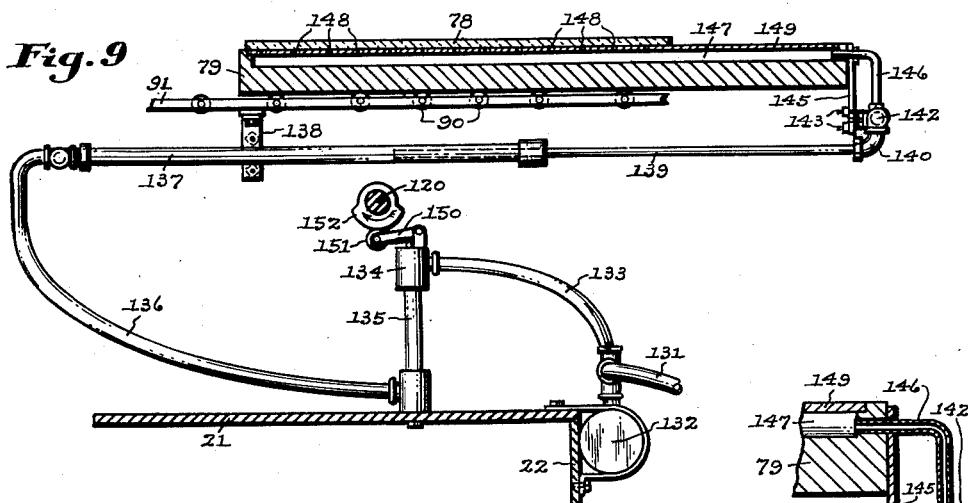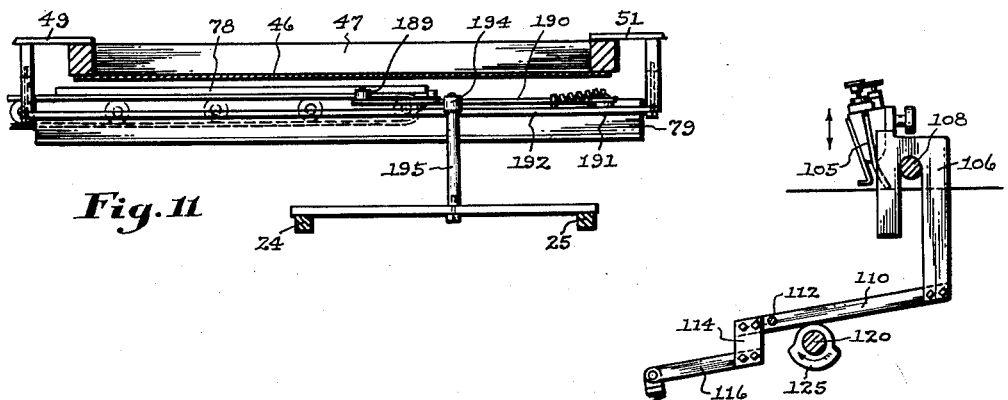

Dec. 30, 1958

J. A. BLACK 2,866,405

SILK SCREEN STENCILLING MACHINE

Filed Feb. 24, 1955

INVENTOR
James A. Black
BY John S. Braddock
ATTORNEY

Dec. 30, 1958     J. A. BLACK     2,866,405
SILK SCREEN STENCILLING MACHINE
Filed Feb. 24, 1955     7 Sheets-Sheet 7
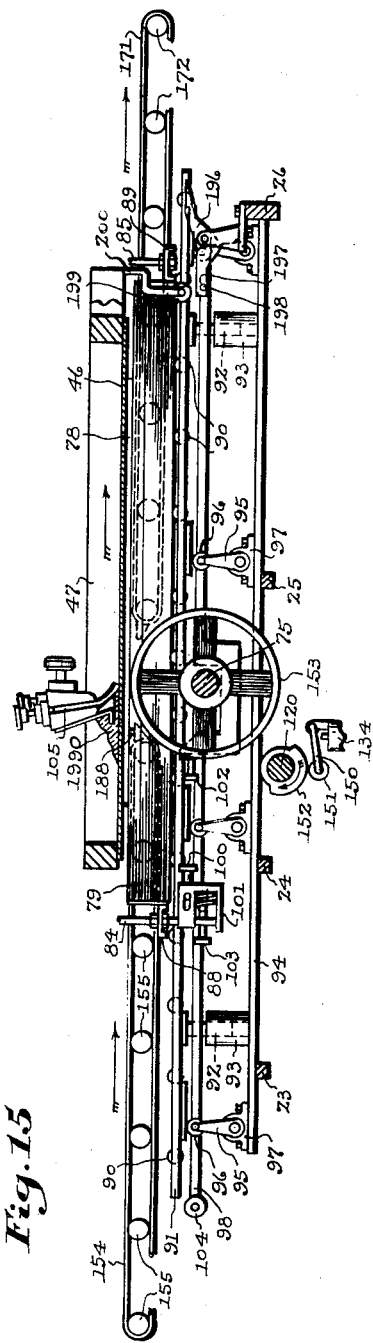
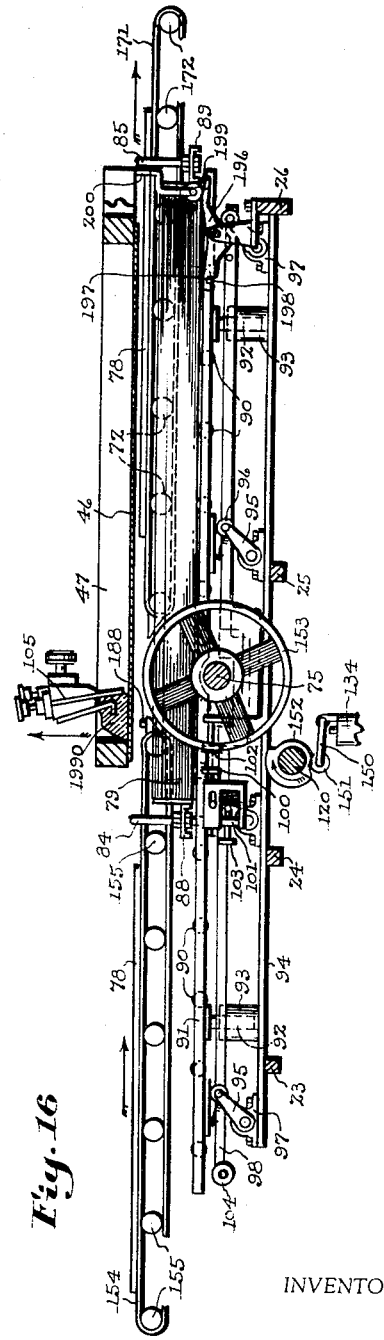
INVENTOR
James A. Black
BY John S. Braddock
ATTORNEY

United States Patent Office 2,866,405
Patented Dec. 30, 1958

2,866,405

SILK SCREEN STENCILLING MACHINE

James A. Black, Grand Rapids, Mich.

Application February 24, 1955, Serial No. 490,276

17 Claims. (Cl. 101—126)

The present invention relates to silk screen stencilling machines.

The primary objects of the invention are to provide a fully automatic, high-speed silk screen stencilling machine which will print on rigid or semi-rigid stock of substantial thickness such as sheet metal, glass, plywood, composition boards and other like materials, although not being limited to such use but being also adaptable for silk screen printing on paper, plastic films and other less rigid materials.

The present machine, while being entirely new, utilizes certain principles and embodies certain features and combinations of features, disclosed in my United States Patents No. 2,528,779, issued December 18, 1951 and No. 2,606,492, issued August 12, 1952.

An illustrative embodiment of the invention is shown in the accompanying drawings, wherein:

Figure 5 is a fragmentary horizontal sectional view of parts of the machine taken on line 5—5 of Figure 4;

Figure 6 is a fragmentary vertical sectional view thereof taken on line 6—6 of Figure 5;

Figure 7 is an enlarged fragmentary vertical sectional view of parts of the machine taken on lines 7—7 of Figures 5 and 8;

Figure 8 is an enlarged fragmentary vertical sectional view of parts thereof taken on lines 8—8 of Figures 5 and 7;

Figure 9 is a fragmentary view partly in side elevation and partly in vertical section taken on lines 9—9 of Figures 3 and 4;

Figure 10 is an enlarged fragmentary vertical sectional view of certain of the parts shown in Figure 9;

Figure 11 is a fragmentary view of parts of the machine partly in side elevation and partly in vertical section taken on line 11—11 of Figure 1;

Figure 12 is a fragmentary view of certain other parts of the machine shown partly in side elevation and partly in vertical section taken on lines 12—12 of Figures 1 and 3;

Figures 13, 14, 15 and 16 are somewhat diagrammatic views showing parts of the machine in vertical section or in side elevation and in different moved positions in the several views, for illustrating the operation of the machine.

Figure 1:
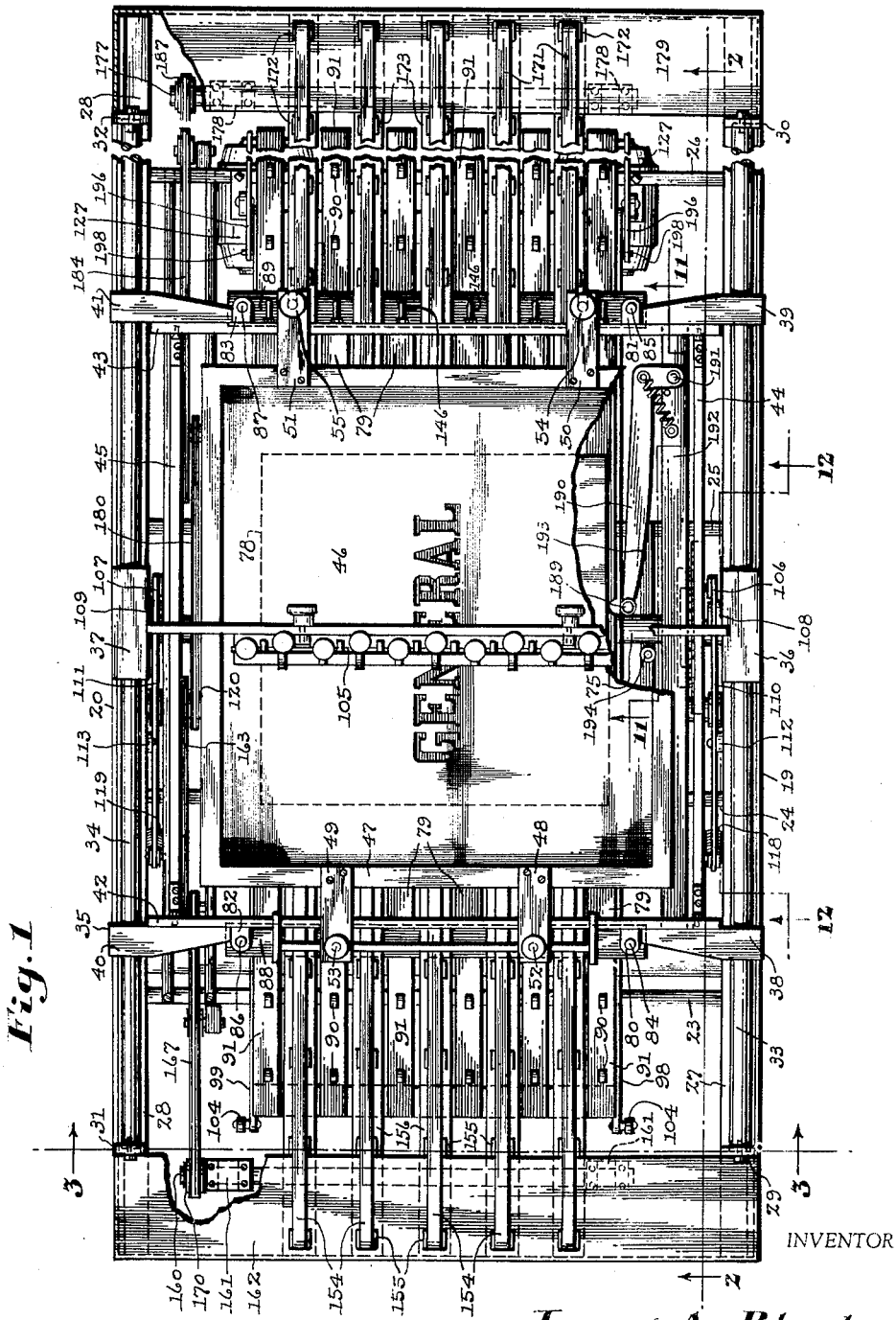
Figure 1 is a top plan view of the machine wherein certain fragments thereof have been broken away to expose parts beneath.

Referring now in detail to these drawings wherein certain like parts are designated by the same numerals in the several views, the various parts of the machine are mounted upon and more or less housed within a frame comprising spaced upstanding side castings 19, 20 connected by a platform 21, an apron 22, and spaced tie-bars 23, 24, 25 and 26, and a pair of parallel, horizontal angle bars 27, 28 mounted in said castings and extending the full length of the machine. Upright posts 29, 30 are secured by means of bolts to the opposite ends of the casting 19 and similar upright posts 31, 32 are secured to the opposite ends of the casting 20. These posts support parallel guide rods 33, 34 at opposite sides of the frame on which rods a stencil carriage generally designated 35 is mounted for horizontal reciprocal movement. The guide rods 33, 34 are additionally supported in their middles by means of supporting blocks 36, 37 mounted on the castings 19, 20 respectively.

The stencil carriage 35 consists of pairs of bearing blocks 38, 39 and 40, 41 at the four corners thereof which are slidable on the guide rods 33, 34 respectively. The pairs of opposite blocks are connected by transverse bars 42, 43 at opposite ends of the carriage, and these bars 42, 43 are connected by longitudinal rack bars 44, 45 at opposite sides of the carriage, said rack bars each being provided with a toothed rack on its underside. The silk screen stencil 46 of the machine is mounted on the underside of a rectangular stencil frame 47 on the end rails which are secured pairs of bars 48, 49 and 50, 51 which in turn are secured to the stencil carriage 35 by means of hand screws 52, 53 and 54, 55.

The prime driving force of the machine is supplied by a motor 56 (see Figures 2 and 3) mounted on the platform 21 and having electrical connections 57 to a suitable source of electricity. The shaft 58 of the motor 56 carries a pulley 59, and an endless belt 60 passes around this pulley 59 and a pulley 61 on a gear reducer 62 also mounted on the platform 21. Suitable gearing within the reducer transmits the rotary movement of pulley 61 to a shaft 63 of the gear reducer, which shaft 63 carries on its outer end a crank arm 64. A crank bar 65 operatively connects the crank arm 64 to a sector 66 pivotally mounted on a shaft 67 journalled in pillow blocks 68, 69 mounted on the machine's platform 21, and the sector 66 is thus reciprocated forwardly and rearwardly about its axis. The sector 66 meshes with a gear 70 on a shaft 71 having its opposite ends journalled in the casting 19 and in a post 72 mounted on the platform 21. The shaft 71 also carries a gear 73 which meshes with a gear 74 on the main shaft 75 of the machine. Other gears 76, 77 on said main shaft 75 at opposite sides of the machine mesh with the toothed racks on the undersides of bars 44, 45 thus to impart horizontal reciprocating movement to the stencil carriage 35 and the stencil 46 carried thereby. The movement of the stencil to the right as viewed in Figures 1 and 2 constitutes the advancing or print stroke of the machine, whereas the movement of the stencil to the left constitutes the returning or non-print stroke.

Flat stock 78, such as sheet metal or glass, is supported beneath the stencil 46 for processing, by means of spaced, parallel and connected supporting rail elements 79 which are mounted for horizontal reciprocating movement with the stencil and also for vertical reciprocating movement relative to the stencil. The means for so mounting the rails 79 comprise vertical slide bearing members 80, 81, 82 and 83 at the four corners of the stencil carriage 35, in which are vertically slidably disposed posts 84, 85, 86 and 87 secured to channel bars 88, 89 which connect the rails 79 at their opposite ends. The rails 79 travel in their horizontal reciprocating movement on rollers 90 which are set in spaced, parallel and connected tracks 91 which constitute an integrated track assembly, and this track assembly is mounted for vertical reciprocating movement on posts 92 slidably disposed in vertical bearings 93 (see Figures 2 and 13–16) mounted on a pair of spaced supporting bars 94 which are secured to the frame's tie-bars 23, 24, 25 and 26, at opposite sides of the track assembly. Levers 95 having rollers 96 are turnably mounted in bearings 97 on the supporting bars 94, and these levers 95 support the track assembly from beneath. Actuator bars 98, 99 connect the levers 95 at opposite sides of the machine, said actuator bars being reciprocally movable to turn the levers 95 in unison to raised positions for elevating the tracks 91, rails 79 and stock 78 carried thereby during the print stroke of the machine, and to lowered positions for lowering the tracks, the rails and the stock upon completion of the print stroke. These actuator bars 98, 99 are moved to lowering position upon completion of the print stroke by contact of spring-cushioned buttons 100 on control assemblies 101 depending from the outer rails 79, with stops 102 on the actuator bars 98, 99. The actuator bars are moved to elevating position upon completion of the returning non-print stroke by contact of other spring-cushioned buttons 103 on the control assemblies 101 with other stops 104 on the actuator bars 98, 99.

The machine's squeegee assembly is generally designated 105, and is mounted for vertical reciprocating movement about the stencil 46 to a lowered position on the stencil for forcing coating material therethrough and onto the stock 78 during the print stroke of the machine, and to a raised position out of contact with the stencil during the returning non-print stroke of the machine. The means for so reciprocating the squeegee is best illustrated in Figure 12, and comprises inverted U-shaped supports 106, 107 for supporting the squeegee at opposite sides of the machine, which supports 106, 107 are guided in their vertical movement by studs 108, 109 projecting inwardly from the castings 19, 20 respectively. The right hand legs of the supports 106, 107 as viewed in the drawings are connected to the right hand ends of levers 110, 111 which are pivotally connected intermediate their ends at 112, 113 to said castings 19, 20. The opposite or left hand ends of levers 110, 111 are connected by means of plates 114, 115 and bars 116, 117 to the upper ends of counterbalancing compression springs 118, 119 the lower ends of which are pivotally secured to the machine's platform 21.

A camshaft 120 extending the width of the machine has its opposite ends journalled in the castings 19, 20 and is driven by an endless sprocket chain 121 (see Figures 2 and 3) passing around a sprocket wheel 122 on this camshaft 120, around an idler sprocket wheel 123 mounted on the platform 21, and around a sprocket wheel 124 mounted on the shaft 63 of the gear reducer 62. Cams 125, 126 (see Figure 12) on the camshaft 120 bear against the undersides of bars 110, 111 to the right of the latter's pivotal connections at 112, 113 to the machine's frame, and these cams 125, 126 operate to lower the squeegee 105 onto the stencil during the print stroke of the machine and to raise the squeegee off the stencil during the machine's non-print stroke.

Suction means are provided on the rails 79 for effecting adherance of the stock 78 to the rails during the print stroke of the machine and for releasing the stock from the rails upon completion of the print stroke. Twin motors 127 having suitable electrical connections 128 are mounted beneath the righ hand end of the machine as viewed in Figure 2 and are coupled at 129 to suction pumps 130 which maintain a constant vacuum in conduits 131, in vacuum tanks 132 and in conduits 133 leading from the tanks 132 to valves 134 mounted on top of twin tubular columns 135 which are secured at their lower extremities to the platform 21 (see Figure 9). Other conduits 136 of flexible hose connect the lower ends of the tubular columns 135 to vacuum cylinders 137 which are suspended from the track assembly 91 by means of hangers 138 and which are vertically movable with said track assembly. Hollow pistons 139 (see Figures 9 and 10) have their left hand ends longitudinally slidably disposed in the vacuum cylinders 137 and are in sealed communication with the interiors of said vacuum cylinders by means of suitable packing rings. The other or right hand ends of the hollow pistons 139 have rigid connections to the right hand ends of the rails 79 so that these hollow pistons are horizontally reciprocal with the rail assembly. Said connections comprise elbows 140 connected to the pistons 139 and to short conduits 141 connected to the underside of a transverse pipe 142 which is rigidly secured by means of bolts 143 and spacers 144 to brackets 145 depending from the rail assembly. An L-shaper conduit 146 leads from the upper side of the transverse pipe 142 to each of the rails 79, and said conduits 146 communicate with longitudinal chambers 147 in the upper parts of the rails 79 for applying suction at apertures 148 in plates 149 set into the recessed upper surfaces of said rails.

The suction system above described is such that there is constant vacuum between the compressors 130 and valves 134, and the valves 134 operate intermittently to apply or to relieve suction in the rails 79 through columns 135, conduits 136, cylinders 137, hollow pistons 139, elbows 140, transverse pipe 142, L-shaped conduits 146 and chamber 147 in the rails. Valves 134 have operating arms 150 provided with rollers 151 which ride the outer surfaces of cams 152 mounted on the camshaft 120, said cams 152 being so formed that valves 134 are opened during the print stroke of the machine thus applying suction to the rails to effect adherance of the stock thereto during said print stroke, and the valves 134 are operated by cams 152 upon completion of the print stroke to close off the suction and admit air to the system between the valves 134 and the rails 79 thus to relieve the suction on the rails and release the stock from the rails upon the completion of said print stroke.

An important feature of the invention is the provision of means for supporting the stock in the spaces between the rails and directly beneath the squeegee during the printing operation so that a continuous line of support is provided for the stock beneath the line of bearing of the squeegee against the stencil and the stock. These supporting elements comprise drum elements 153 alternating between the rails 79 in juxtaposition therewith, and mounted on the main shaft 75 for reciprocating rotary movement with said shaft and for consequent coordinated movement with the rails 79. When the rails 79 are in their elevated position during the print stroke of the machine, the stock 78 being processed is supported in a plane tangential to the drums 153 and coincident with the flat upper surfaces of the rails. Thus the rails 79, drums 153, stock 78 and stencil 46 are moved in unison progressively past the lowered squeegee 105, and coating material is forced through the stencil onto the stock directly above the continuous supporting line of tangency existing between the drum elements 153 and the rail elements 79.

A conveyor system is built into the machine and includes a feed conveyor at the left hand end of the machine as viewed in the drawings and a takeoff conveyor at the right hand end thereof. The feed conveyor comprises feed conveyor tapes 154 which pass around series of rollers 155 journalled in conveyor supports 156 disposed between the rails 79 of the machine. These feed conveyor tapes 154 also pass around idler pulleys 157, 158 (see Figure 2) and driving pulleys 159 mounted on a transverse driving shaft 160 journalled in hanger bearings 161 depending from the horizontal portion of a cross-sectionally L-shaped shield 162 mounted on the angle bars 28 at the upper left end of the machine as viewed in Figure 2. As best seen in Figures 5 and 6, the driving shaft 160 for the feed conveyor takes its power from the camshaft 120 through a series of sprocket wheels and chains comprising a chain 163 passing around sprocket wheel 164 on the camshaft 120 and sprocket wheel 165 on a shaft 166 mounted on the machine's frame, and another chain 167 passing around a sprocket wheel 168 on said shaft 166, an idler sprocket 169 mounted on the tie-bar 23, and a sprocket wheel 170 mounted on the feed conveyor's driving shaft 160.

The takeoff conveyor comprises takeoff conveyor tapes 171 which pass around series of rollers 172 journalled in conveyor supports 173 also disposed between the rails 79 of the machine. These takeoff conveyor tapes 171 also pass around idler pulleys 174, 175 (see Figure 2) and driving pulleys 176 mounted on a transverse driving shaft 177 journalled in hanger bearings 178 depending from the horizontal portion of a cross-sectionally L-shaped shield 179 mounted on the angle bars 28 at the upper right end of the machine as viewed in Figure 2. Also as best seen in Figures 5 and 6, the driving shaft 177 for the takeoff conveyor takes its power from the camshaft 120 through a series of sprocket wheels and chains comprising a chain 180 passing around a sprocket wheel 181 on the camshaft 120 and sprocket wheel 182 on a shaft 183 mounted on the machine's frame, and another chain 184 passing around a sprocket wheel 185 on said shaft 183, an idler sprocket 186 mounted on the tie-bar 26, and a sprocket wheel 187 mounted on the takeoff conveyor's driving shaft 177.

Operation

The operation of the machine may best be understood by reference to the diagrammatic illustrations shown in Figures 13, 14, 15 and 16.

Figure 13 illustrates the parts of the machine as they would appear during the final phase of the machine's cycle of operation, i. e. during the returning or non-print stroke of the machine. The track assembly 91 is in a lowered position so that the rail assembly 79 which rides on the track assembly 91 is also in a lowered position and the upper stock-supporting surfaces of the rails are thus below the level of the feed conveyor tapes 171. The squeegee 105 is in a raised position off the silk screen stencil 46, and the stencil frame 47 and rails 79 are moving to the left. A sheet of stock 78a which has already been processed is being moved out of the machine by the takeoff conveyor tapes 171 which run continuously to the right. A fresh sheet of stock 78 has been deposited on the feed conveyor tapes 154 which also run continuously to the right. This sheet 78 has been advanced into contact with stops 188 on the conveyor supports 156 which stop the advancing movement of the sheet while the feed conveyor tapes 154 run idly beneath it. While in this position the sheet is brought into correctly registered lateral position by a roller 189 (see Figures 1 and 11) on an arm 190 which is pivoted at 191 to a bar 192 secured to and movable with the stencil carriage generally designated 35. This arm 190 has a camming surface 193 which contacts a roller 194 mounted on a post 195 on the frame of the machine, so that the arm 190 is moved inwardly a predetermined distance during the returning movement of the stencil carriage to the left. During this movement, roller 189 bears against the adjacent edge of the stock sheet 78 thus moving the sheet into correctly adjusted lateral position.

In Figure 14 the rails 79 and stencil frame 47 have just completed their returning movement to the left. Buttons 103 on control assemblies 101 depending from opposite sides of the stencil carriage have contacted stops 104 on actuator bars 98, 99, thus moving said bars to the left and thus turning the levers 95 counter-clockwise to elevate the track assembly 91 and the rails 79 carried thereby. The rails 79 thus lift the stock sheet 78 off the feed conveyor tapes 154 and above the stops 188 and guide rollers 189. At the same time, cams 152 on camshaft 120 which runs continuously in a clockwise direction open valves 134 thus applying suction through the system shown in Figures 9 and 10 to the rails 79 and to the stock 78 through the apertures 148 in the rails, and thus effecting adherence of the stock to the rails for the advancing or print stroke of the machine.

By a comparison of Figures 13 and 14 it will also be seen that latch members 196 mounted on the frame's tie-bar 26, have been turned clockwise so that their slots 197 engage pins 198 on the track assembly 191 to positively prevent lowering movement of the track assembly during the print stroke of the machine. Also the squeegee 105 has been lowered into printing position on the stencil screen 46 by the cams 125 on the camshaft 120, through the mechanisms best illustrated in Figure 12.

During the advancing print stroke of the machine, to the right as viewed in Figure 15 and also illustrated in Figures 7 and 8, coating material 1990 is forced through the stencil 46 and onto the stock 78 by the squeegee 105. Directly beneath the squeegee's line of contact with the stencil, the stock 78 is supported progressively at the continuous line of tangency existing between the juxtaposed rails 79 and alternating drums 153 which are reciprocated in unison in horizontal and rotary movements respectively by the driving mechanism best illustrated in Figures 2 and 3 and hereinbefore described.

In Figure 16 the advancing print stroke of the machine has just been completed. Cams 125, 126 now operate to raise the squeegee off the stencil 46, and cams 150 operate the valves 134 to relieve the suction on the rails 79 thus releasing the stock 78 from the rails. Buttons 100 on the control assemblies 101 depending from the rails, now contact stops 102 on actuator bars 98 thus moving said bars to the right and thus turning levers 95 in a clockwise direction to lower the track assembly 91 and rails 79. It will be seen from a comparison of Figures 15 and 16 that upon completion of the print stroke of the machine, rollers 199 on brackets 200 depending from the stencil carriage have contacted latch members 196 to move the latter out of engagement with the pins 198 on the track assembly 91 thus to permit the track assembly to move to the right while descending to lower the rails 79. The rails having passed beyond the drums 153, the stock 78 carried thereby is deposited on the takeoff conveyor tapes 171 when the rails descend, and the machine's various parts are now again ready for the returning non-print stroke illustrated in Figure 13.

Figure 2:
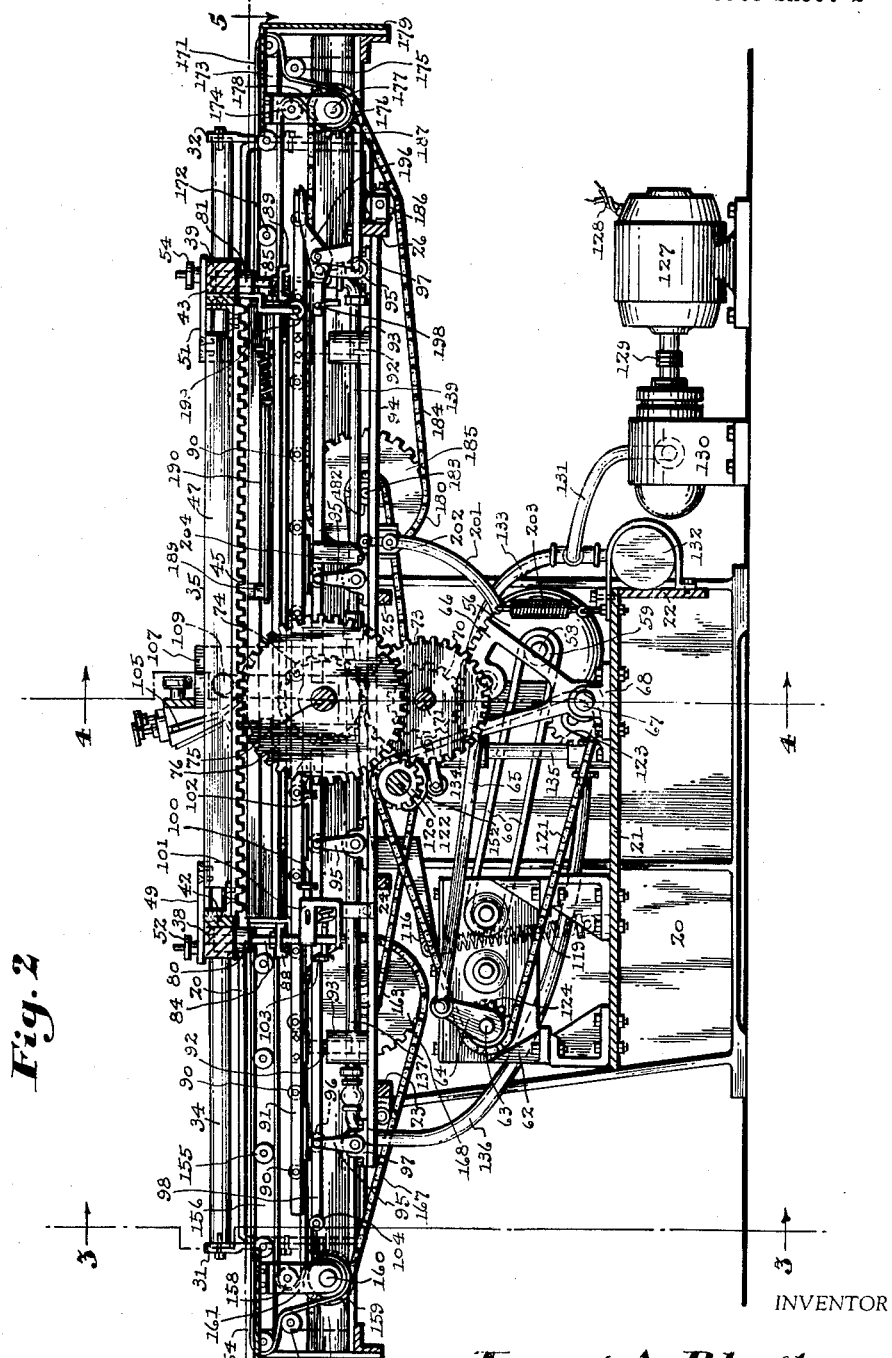
Figure 2 is a vertical sectional view of the same taken on lines 2—2 of Figures 1 and 3.
Figure 3:
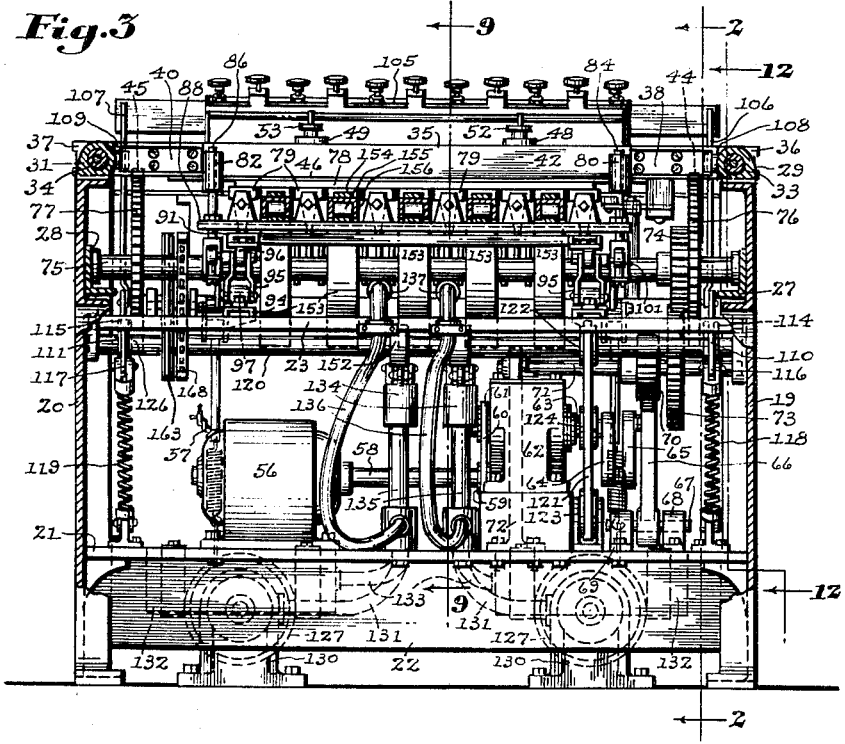
Figure 3 is a vertical sectional view thereof taken on lines 3—3 of Figures 1 and 2.
Figure 4:
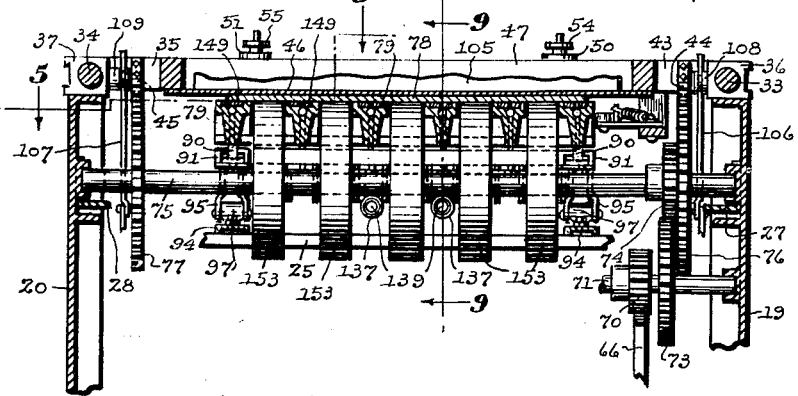
Figure 4 is a fragmentary vertical sectional view of parts of the machine taken on line 4—4 of Figure 2.

If found necessary or desirable a counterbalancing device may be provided for assisting in the elevation of the track assembly upon completion of the non-print stroke of the machine. Such a device is indicated in Figure 2 and comprises a lever 201 pivotally mounted at 202 on the machine's frame, and this lever 201 is urged in a counter-clockwise direction by a tension spring 203 secured to the lever's lower arm and to the platform 21 of the machine. When nearing completion of the print stroke, a camplate 204 depending from the track assembly 91 rides over the upper arm of this lever 201, and upon completion of the print stroke said upper arm of the lever engages behind the camplate 204 to urge the track assembly in an upward direction.

The silk screen stencil frame 47 may be adjusted to accommodate varying thicknesses of stock to be processed by any suitable means such as by inserting appropriate shims (not shown) between the stencil frame 47 and its supporting bars 49 or between the supporting bars 49 and the stencil carriage 35.

Having thus described my new silk screen stencilling machine, it will be understood that the drawings and the preceding description merely disclose a preferred embodiment of the invention. Such modifications of the machine as may be conceived through omission, addition or alterations of the particular embodiment of the invention herein disclosed as fall within the scope of the appended claims, are to be considered as within the comprehension and the spirit of the invention. For example, my conception of a stock-supporting line of tangency between juxtaposed rail elements and drum elements, directly beneath the line of application of the squeegee to the stencil and the stock to be processed, is herein disclosed as being accomplished by the use of conveyor tapes at a set elevation, drum elements with their uppermost lines of tangency at higher elevations, and rail elements vertically movable to lift the stock off the conveyor tapes and into a plane of tangency existing between the drum elements and the rail elements when the latter are in their elevated positions. This arrangement is manifestly reversible so that the drum elements and rail elements might both be at set elevations with a plane of tangency existing between them for the support of stock at the processing station, and the conveyor tapes made vertically reciprocable to lower the stock into said plane of tangency for the print stroke and to elevate the stock for free delivery after the print stroke has been completed.

The invention being intended to be defined by the claims, is therefore not to be limited to or by details of construction of the particular embodiment thereof herein shown and described, but encompasses any and all such modifications thereof as are included within the scope of the following claims.

I claim:

1. In a silk screen stencilling machine: a frame; alternating drum elements and rail elements mounted on the frame in juxtaposition and providing for flat stock a supporting surface in a plane tangential to the drum elements and coincident with the flat surfaces of the rail elements; means on one of said elements for effecting adherence of flat stock thereto and means for moving said element and the stock carried thereby progressively past the continuous supporting line of tangency existing between said elements; a silk screen stencil mounted adjacent said flat stock for coordinated movement therewith; and means adjacent the stencil for forcing coating material through said stencil onto said stock directly opposite the stock from said tangential line of support.

2. In a silk screen stencilling machine: a frame; alternating drum elements and rail elements mounted on the frame in juxtaposition and providing for flat stock a supporting surface in a plane tangential to the drum elements and coincident with the flat surfaces of the rail elements; means on one of said elements for effecting continuous adherence of flat stock thereto during the processing of said stock; means for simultaneously rotating the drum elements and for moving the rail elements horizontally so that the stock carried thereby is moved progressively past the continuous supporting line of tangency existing between said elements; a silk screen stencil mounted adjacent said flat stock for coordinated movement therewith; and means adjacent the stencil for forcing coating material through said stencil onto said stock directly opposite the stock from said tangential line of support.

3. In a silk screen stencilling machine: a frame; alternating drum elements and rail elements mounted on the frame in juxtaposition and providing for flat stock a supporting surface in a plane tangential to the drum elements and coincident with the flat surfaces of the rail elements; suction means on said rail elements for effecting continuous adherence of flat stock thereto during the processing of said stock; means for simultaneously rotating the drum elements and for moving the rail elements horizontally so that the stock carried thereby is moved progressively past the continuous supporting line of tangency existing between said elements; a silk screen stencil mounted adjacent said flat stock for coordinated movement therewith; and means adjacent the stencil for forcing coating material through said stencil onto said stock directly opposite the stock from said tangential line of support.

4. In a silk screen stencilling machine: a frame; alternating drum elements and rail elements mounted on the frame in juxtaposition and providing for flat stock a supporting surface in a plane tangential to the drum elements and coincident with the flat surfaces of the rail elements; means for simultaneously and reciprocally rotating the drum elements and for moving the rail elements horizontally so that the stock carrier thereby is moved progressively past the supporting line of tangency existing between said elements to effect an advancing print stroke and a returning non-print stroke of the machine; suction means on said rail elements for effecting continuous adherence of flat stock thereto during the print stroke; means for relieving said suction to release the stock carried by the rail elements upon completion of the print stroke; a silk screen stencil mounted adjacent said flat stock for coordinated movement therewith; and means adjacent the stencil for forcing coating material through said stencil and onto said stock directly opposite the stock from said tangential line of support during the print stroke.

5. In a silk screen stencilling machine: a frame; a silk screen stencil mounted on the frame for horizontal reciprocating movement to effect an advancing print stroke and a returning non-print stroke; a stock-supporting rail mounted beneath the stencil for horizontal reciprocating movement therewith and for vertical movement relative thereto; means for depositing flat stock onto the rail prior to the print stroke when the rail is in a lowered position; means for elevating the rail to bring the upper surface of the stock into registry with the stencil prior to the print stroke; and means adjacent the stencil for forcing coating material through said stencil onto said stock during the print stroke of the machine.

6. In a silk screen stencilling machine: a frame; a silk screen stencil mounted on the frame for horizontal reciprocating movement to effect an advancing print stroke and a returning non-print stroke; a stock supporting rail mounted beneath the stencil for horizontal reciprocating movement therewith and for vertical movement relative thereto; means for depositing flat stock onto the rail prior to the print stroke when the rail is in lowered position; means for elevating the rail to bring the upper surface of the stock into registry with the stencil prior to the print stroke; suction means on the rail for effecting adherence of the stock to the rail during the print stroke; means adjacent the stencil for forcing coating material through said stencil onto said stock during the print stroke of the machine; and means for relieving said suction to release the stock carried by the rail upon completion of said print stroke.

7. In a silk screen stencilling machine: a frame; a silk screen stencil mounted on the frame for horizontal reciprocating movement to effect an advancing print stroke and a returning non-print stroke; a stock-supporting rail mounted beneath the stencil for horizontal reciprocating movement therewith and for vertical movement relative thereto; means for depositing flat stock onto the rail prior to the print stroke when the rail is in a lowered position; means for elevating the rail to bring the upper surface of the stock into registry with the stencil prior to the print stroke; a squeegee mounted on the frame above the stencil for vertical reciprocating movement; and means for lowering the squeegee onto the stencil for forcing coating material therethrough onto the stock during the print stroke and for raising the squeegee off the stencil during the non-print stroke.

8. In a silk screen stencilling machine: a frame; a silk screen stencil mounted on the frame for horizontal reciprocating movement to effect an advancing print stroke and a returning non-print stroke; spaced, parallel and connected stock-supporting rails mounted beneath the stencil for horizontal reciprocating movement therewith; means for depositing flat stock onto the rails prior to the print stroke; a squeegee mounted on the frame above the stencil for vertical reciprocating movement; means for lowering the squeegee onto the stencil for forcing coating material therethrough onto the stock during the print stroke and for raising the squeegee off the stencil during the non-print stroke; and elements mounted on the frame between the rails for completing with the rails a continuous line of support for the stock directly beneath the squeegee.

9. A silk screen stencilling machine according to claim 8 characterized by having suction means on the rails for effecting adherance of the stock to the rails during the print stroke and means for relieving the suction to release the stock from the rails upon completion of the print stroke.

10. A silk screen stencilling machine according to claim 8 characterized by having the rails mounted for vertical reciprocating movement beneath the stencil and means for elevating the rails to bring the upper surface of the stock into registry with the stencil prior to the print stroke and for lowering the rails and the stock carried thereby upon completion of the print stroke.

11. In a silk screen stencilling machine: a frame; a silk screen stencil mounted on the frame for horizontal reciprocating movement to effect an advancing print stroke and a returning non-print stroke; spaced, parallel and connected stock-supporting rails mounted beneath the stencil for horizontal reciprocating movement therewith; means for depositing flat stock onto the rails prior to the print stroke; a squeegee mounted on the frame above the stencil for vertical reciprocating movement; means for lowering the squeegee onto the stencil for forcing coating material therethrough onto the stock during the print stroke and for raising the squeegee off the stencil during the non-print stroke; and drums mounted on the frame between the rails for coordinated rotary reciprocating movement therewith, the uppermost surfaces of said drums being tangential to the rails thus completing with the rails a continuous line of support for the stock directly beneath the squeegee.

12. In a silk screen stencilling machine: a frame; a silk screen stencil mounted on the frame for horizontal reciprocating movement to effect an advancing print stroke and a returning non-print stroke; spaced, parallel and connected stock-supporting rails mounted beneath the stencil for horizontal reciprocating movement therewith and for vertical movement relative thereto; means for depositing flat stock onto the rails prior to the print stroke when the rails are in a lowered position; means for elevating the rails to bring the upper surface of the stock into registry with the stencil prior to the print stroke and for lowering the rails and the stock upon completion of the print stroke; a squeegee mounted on the frame above the stencil for vertical reciprocating movement; means for lowering the squeegee onto the stencil for forcing coating material therethrough onto the stock during the print stroke and for raising the squeegee off the stencil during the non-print stroke; drums mounted on the frame between the rails for coordinated rotary reciprocating movement therewith, the uppermost surfaces of said drums being tangential to the rails when the rails are in their elevated position for the print stroke thus completing with the rails a continuous line of support for the stock directly beneath the squeegee.

13. A silk screen stencilling machine according to claim 12 characterized by having suction means on the rails for effecting adherence of the stock to the rails during the print stroke and means for relieving the suction to release the stock from the rails upon completion of the print stroke.

14. A silk screen stencilling machine according to claim 12 characterized by having means whereby the elevation of the stencil may be varied in accordance with the thickness of the stock to be printed.

15. A silk screen stencilling machine according to claim 12 characterized by having feed and takeoff conveyors at opposite ends of the machine between the rails and at levels between the lowered and elevated positions of the upper surfaces of the rails.

16. A silk screen stencilling machine according to claim 12 in which the means for elevating the rails to bring the upper surface of the stock into registry with the stencil prior to the print stroke and for lowering the rails and the stock upon completion of the print stroke comprises spaced, parallel and connected tracks mounted on the frame for vertical movement, levers turnably mounted on the frame and supporting the tracks from beneath, and actuator bars connecting said levers and mounted for reciprocating movement to turn the levers in unison to raised positions during the print stroke and to lowered positions during the non-print stroke of the machine.

17. A silk screen stencilling machine according to claim 16 in which the actuator bars have spaced stops thereon, and means depending from the rails adapted to contact said stops to move the actuator bars to lowering positions upon completion of the advancing print stroke and to elevating positions upon completion of the returning non-print stroke of the machine.

References Cited in the file of this patent
UNITED STATES PATENTS

| | | |
|---|---|---|
| 2,110,140 | Kkopfenstein | Mar. 8, 1938 |
| 2,578,779 | Black | Dec. 18, 1951 |
| 2,606,492 | Black | Aug. 12, 1952 |